April 20, 1937.  O. O. STANLEY  2,078,104
CLEANING AND STERILIZING DEVICE
Filed July 22, 1936  2 Sheets-Sheet 1

Otis O. Stanley, INVENTOR
BY Victor J. Evans & Co.
ATTORNEYS

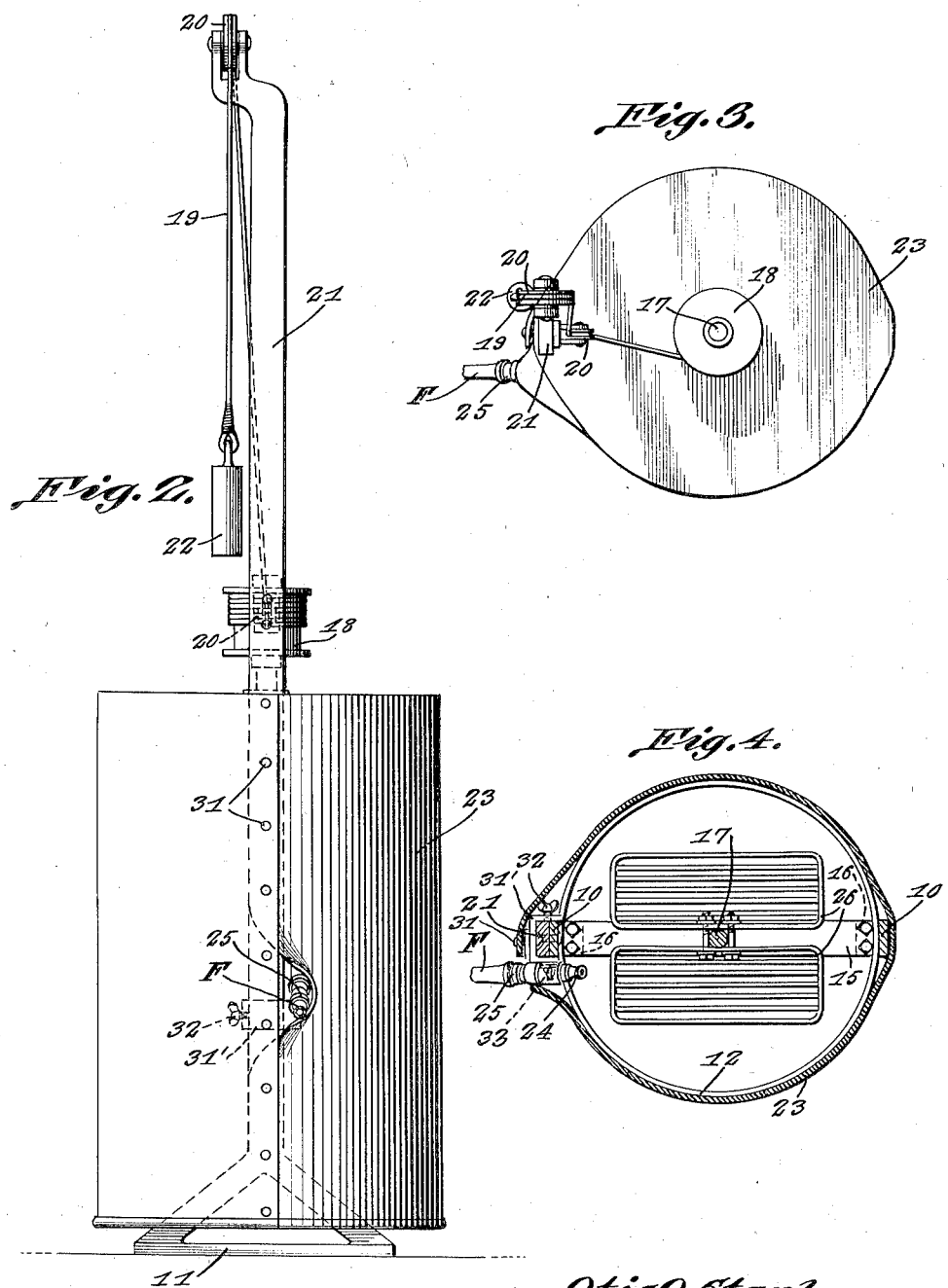

Patented Apr. 20, 1937

2,078,104

UNITED STATES PATENT OFFICE 2,078,104

CLEANING AND STERILIZING DEVICE

Otis O. Stanley, Decatur, Ill.

Application July 22, 1936, Serial No. 91,960

3 Claims. (Cl. 141—9)

The invention relates to a pressure cooker attachment and more especially to a cleaning and sterilizing device.

The primary object of the invention is the provision of a device of this character, wherein articles placed therein can be thoroughly cleaned and sterilized in a unique manner, the device being of novel construction and adaptable for attachment to a pressure cooker or pressure tank of a standard construction.

Another object of the invention is the provision of a device of this character, wherein sterilizing and proper cleaning of table, kitchen, laboratory and other wares can be had and said wares can be readily washed with rapidity.

A further object of the invention is the provision of a device of this character, which is simple in construction, automatic in its working, thoroughly reliable and efficient in operation, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 2 is a sectional view on the line 2—2 of Figure 1 looking in the direction of the arrows.

Figure 3 is a top plan view of the device.

Figure 4 is a sectional view on the line 4—4 of Figure 1.

Similar reference characters indicate corresponding parts throughout the several views in the drawings.

Figure 1:
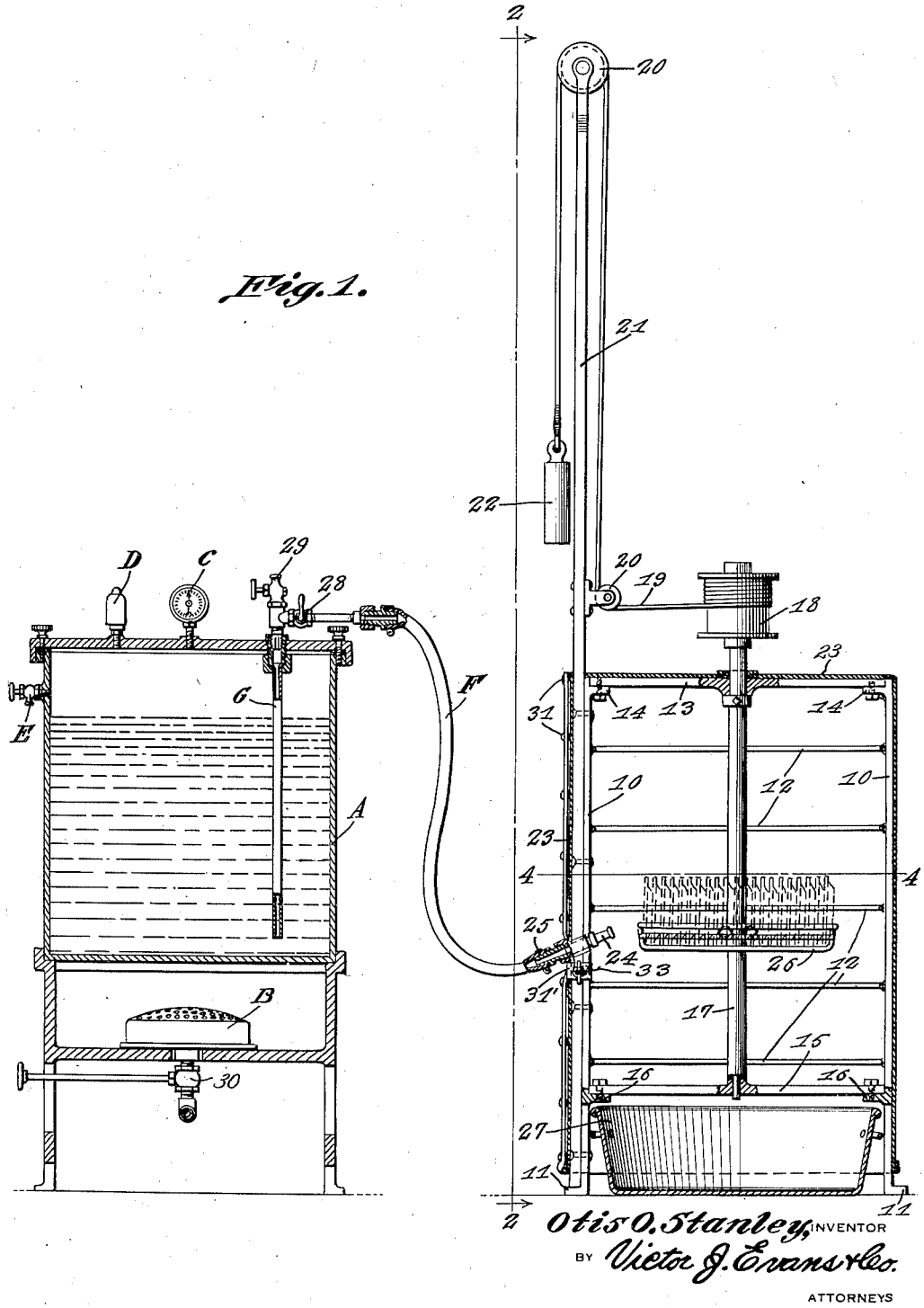
Figure 1 is a vertical sectional view through a pressure tank or pressure cooker and also through the sterilizing device constructed in accordance with the invention.

Referring to the drawings in detail, A designates generally a pressure tank or what may be a pressure cooker which is equipped with a fuel burner B, gage C, safety let-off valve D, fluid leveling cock E and a fluid dispensing hose F, respectively, these parts being of standard or conventional kind. Depending within the tank or cooker is a vertical outlet pipe G which has detachable connection at the top of the said tank or cooker for communication with fittings hereinafter fully described.

Adapted to be arranged adjacent to the tank or cooker A is a sterilizing device which comprises a frame including a pair of opposed uprights 10, these being formed with supporting feet 11 at their lower ends and having attached at intervals throughout their length circular hoops 12 which are joined therewith at the inner faces of said uprights, and at the upper ends of the uprights 10 is a bridge piece 13 suitably secured to bearing lugs 14 while near the lower ends of said uprights is a cross bar 15, it being secured to lugs 16. Journaled centrally of the bridge piece 13 and the cross bar 15 is a rotatable shaft 17, the same being extended above the frame and having fixed to its uppermost end a windlass or drum 18 for the winding and unwinding of a cable 19 on and from the same. The cable 19 is trained over guide pulleys 20 carried by a staff 21 fixed to one of the uprights 10 and rises a considerable distance above the said frame. The outer end of the cable 19 suspends a weight 22. The cable when wound upon the windlass or drum 18 through the weight on the cable 19 will effect the rotation of the shaft 17.

Enveloping the frame over the top and sides thereof is a water-proof canopy or cover 23 and suitably fitted in the frame to project within the latter is a spray nozzle 24 which through a separable coupling 25 is attached to the hose F so that fluid within the tank or cooker A can be discharged into the frame for sterilizing wares confined therein.

The nozzle 24 is so mounted as to be adjustable both as to position on the upright 10 and also as to direction of spray flow relative to the tray 26.

Carried by the shaft 17 which is vertically disposed is a pair of trays 26, these accommodating articles or wares to be sterilized, the nozzle 24 being in substantially the same plane with said trays. Thus when the shaft 17 is rotated the articles or wares carried in the trays 26 will be turned in the path of the spray of sterilizing solution or fluid delivered from the nozzle 24, the supply of such fluid being had from the tank or cooker A.

Removably arranged in the frame below the cross bar 15 is a drain pan or receptacle 27 to catch the drippings or spent fluid within said sterilizer.

The hose F with its fittings has arranged therein a cut-off valve 28 and an escapement valve 29, respectively.

The tank or cooker A is filled to a predetermined level with a sterilizing solution which is heated to such a degree as may be required, and placed under pressure, say twenty pounds pressure registered on the gage C, the safety valve D being set at that pressure. When the designated pressure is attained the weight 22 is released, it being understood, of course, that the cable 19 has been fully wound upon the windless or drum 18 whereupon the shaft 17 is rotated in a clockwise direction. On the spraying of the sterilizing solution into the frame the wares or articles carried in the trays 26 will be thoroughly cleaned and the spent solution will be caught in the pan 27 which is discarded and not reused. In this manner the articles or wares will be thoroughly cleaned and sterilized. The volume of the spray of the solution is controllable by the valve 28 which is hand operated.

The heating of the solution within the tank A is had by the burner B, it being equipped with a valve 30 to control such burner.

The canopy or cover 23 loosely envelops the frame and at the stretch thereof overlying the staff 21 there is a longitudinal slit with the edges next thereto overlying each other and provided with snap fasteners 31 so that in this manner the canopy or cover can be opened or closed to enable the placing of articles or wares within the frame upon the trays 26 or their removal therefrom.

The nozzle 24 is preferably carried by a bracket 31' attached to the upright 10 by a set screw 32 and this bracket is longitudinally adjustable on said upright while the holder 33 for the hose included with said bracket can be swung to change the angular position of the nozzle 24 as may be desired.

The pipe G in the tank or cooker delivers the cleansing solution therefrom to the hose and the valve 28 regulates the supply of such fluid to said hose.

What is claimed is:

1. A device of the character described comprising a vertical frame including opposed uprights, hoops fixed to said uprights at intervals throughout the vertical extent thereof, a vertical shaft journaled centrally in the frame, trays carried by said shaft, a spray element fitted to the frame and extended within the same for delivering fluid to articles upon said trays, a canopy covering for said frame, means for delivering fluid under pressure to said spray element, a windlass on the upper end of the shaft, a staff rising from the frame, a cable for winding and unwinding on and from the windlass, means on the staff for guiding said cable, and a weight suspended by said cable.

2. A device of the character described comprising a vertical frame including opposed uprights, hoops fixed to said uprights at intervals throughout the vertical extent thereof, a vertical shaft journaled centrally in the frame, trays carried by said shaft, a spray element fitted to the frame and extended within the same for delivering fluid to articles upon said trays, a canopy covering for said frame, means for delivering fluid under pressure to said spray element, a windlass on the upper end of the shaft, a staff rising from the frame, a cable for winding and unwinding on and from the windlass, means on the staff for guiding said cable, a weight suspended by said cable, and a drain pan removably fitted in the lower end of the frame.

3. A device of the character described comprising a vertical frame including opposed uprights, hoops fixed to said uprights at intervals throughout the vertical extent thereof, a vertical shaft journaled centrally in the frame, trays carried by said shaft, a spray element fitted to the frame and extended within the same for delivering fluid to articles upon said trays, a canopy covering for said frame, means for delivering fluid under pressure to said spray element, a windlass on the upper end of the shaft, a staff rising from the frame, a cable for winding and unwinding on and from the windlass, means on the staff for guiding said cable, a weight suspended by said cable, a drain pan removably fitted in the lower end of the frame, and means arranged within the frame for journaling the shaft therein.

OTIS O. STANLEY.